US012666516B2

(12) United States Patent
Polat et al.

(10) Patent No.: US 12,666,516 B2
(45) Date of Patent: Jun. 23, 2026

(54) LOCATIONS DETERMINATIONS

(71) Applicant: Hewlett-Packard Development Company, L.P., Spring, TX (US)

(72) Inventors: Cem Deniz Polat, Spring, TX (US); Alan Man Pan Tam, Spring, TX (US); Nick Thamma, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 21 days.

(21) Appl. No.: 18/836,293

(22) PCT Filed: Feb. 23, 2022

(86) PCT No.: PCT/US2022/017543

§ 371 (c)(1),
(2) Date: Aug. 6, 2024

(87) PCT Pub. No.: WO2023/163698

PCT Pub. Date: Aug. 31, 2023

(65) Prior Publication Data

US 2025/0040019 A1 Jan. 30, 2025

(51) Int. Cl.
*H05B 47/125* (2020.01)
*H05B 47/165* (2020.01)

(52) U.S. Cl.
CPC ......... *H05B 47/125* (2020.01); *H05B 47/165* (2020.01)

(58) Field of Classification Search
CPC .... H05B 47/11; H05B 47/105; H05B 47/125; H05B 47/165; G01S 5/16; G01S 13/06; G01S 17/06; H04L 67/12; H04L 67/30; H04M 1/72454; H04W 4/029
See application file for complete search history.

(56) References Cited

U.S. PATENT DOCUMENTS

| | | | | |
|---|---|---|---|---|
| 7,800,044 | B1 | 9/2010 | Kahn et al. | |
| 7,894,177 | B2 | 2/2011 | Rothkopf | |
| 9,009,505 | B2 | 4/2015 | Ellenby et al. | |
| 9,645,836 | B2 | 5/2017 | Rothkopf | |
| 9,871,589 | B2 | 1/2018 | Breuer et al. | |
| 10,006,986 | B2 | 6/2018 | Jovicic et al. | |
| 10,186,078 | B2 | 1/2019 | Jang et al. | |
| 10,671,826 | B2 | 6/2020 | Torello et al. | |
| 2014/0375982 | A1 | 12/2014 | Jovicic et al. | |
| 2015/0153160 | A1 | 6/2015 | James | |
| 2016/0310027 | A1* | 10/2016 | Han | A61B 5/02427 |

(Continued)

FOREIGN PATENT DOCUMENTS

| | | |
|---|---|---|
| CN | 105308415 A | 2/2016 |
| TW | 201901369 A | 1/2019 |

(Continued)

*Primary Examiner* — Tung X Le
(74) *Attorney, Agent, or Firm* — Quarles & Brady LLP

(57) ABSTRACT

In some examples, an electronic device includes a photosensor and a controller. The controller determines a first delta value and a second delta value via the photosensor. The first delta value is associated with a first lighting attribute of a first location, and the second delta value is associated with a second lighting attribute of the first location. The controller determines if the electronic device has moved from the first location to a second location based on the first delta value and the second delta value.

20 Claims, 8 Drawing Sheets

(56) References Cited

U.S. PATENT DOCUMENTS

| | | | | |
|---|---|---|---|---|
| 2016/0360344 | A1 | 12/2016 | Shim et al. | |
| 2017/0357329 | A1 | 12/2017 | Park et al. | |
| 2018/0329515 | A1 | 11/2018 | Ju et al. | |
| 2019/0362688 | A1* | 11/2019 | Wang | G09G 5/10 |
| 2020/0042006 | A1* | 2/2020 | Jessen | H04L 12/2809 |
| 2020/0348790 | A1* | 11/2020 | Vampola | G09G 3/3406 |
| 2022/0052867 | A1 | 2/2022 | Nakano et al. | |
| 2022/0276660 | A1 | 9/2022 | Kwak | |
| 2023/0388016 | A1* | 11/2023 | Padmaraju | H04B 10/50575 |
| 2024/0135854 | A1* | 4/2024 | Wen | G09G 3/2007 |

FOREIGN PATENT DOCUMENTS

| | | | |
|---|---|---|---|
| TW | 202115516 | A | 4/2021 |
| TW | 202147792 | A | 12/2021 |

* cited by examiner

LOCATIONS DETERMINATIONS

BACKGROUND

Electronic devices such as desktops, laptops, notebooks, tablets, and smartphones are utilized in numerous different locations. Based on a location of an electronic device, a user adjusts resource settings of the electronic device.

BRIEF DESCRIPTION OF THE DRAWINGS

Various examples are described below referring to the following figures.

DETAILED DESCRIPTION

Figure 1A:
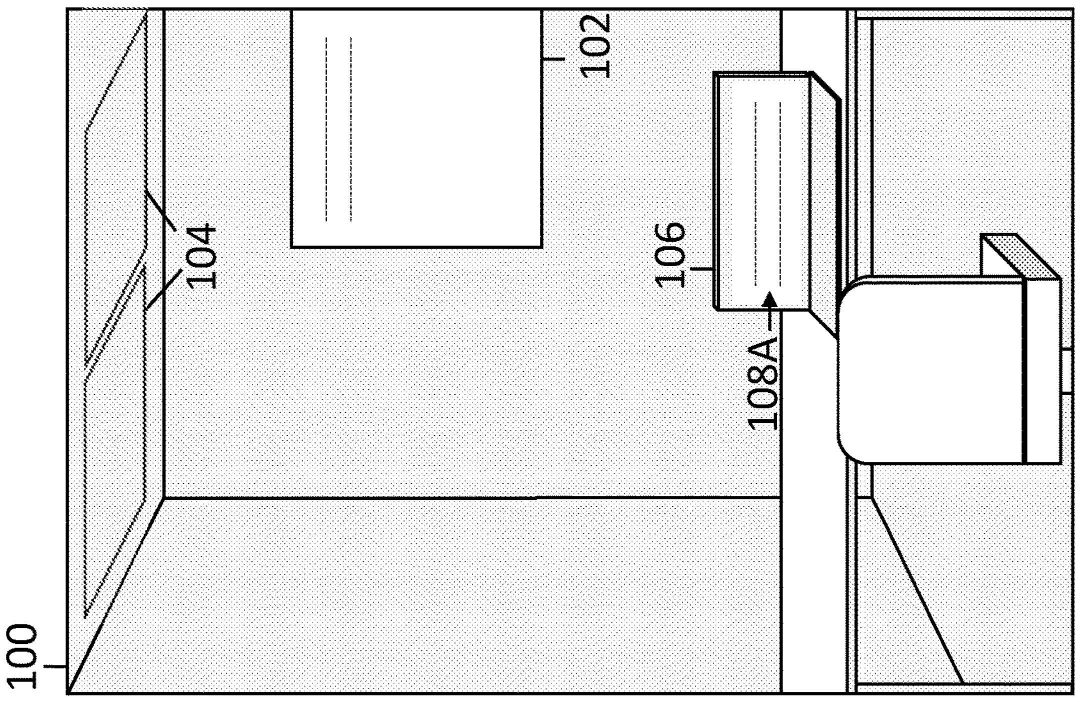
FIGS. 1A and 1B are block diagrams depicting an electronic device in different locations, in accordance with various examples.

As described above, in response to a change in a location of an electronic device, a user of an electronic device adjusts resource settings of the electronic device. Location, as used herein, refers to an area within a specified boundary. The specified boundary is a room, a building, a structure, or other suitable dimension demarcation. The resources include hardware components (e.g., image sensors, speakers, microphones, display devices, network interface devices), executable code (e.g., machine-readable instructions), or a combination thereof. To adjust a resource setting of a resource, the user accesses a graphical user interface (GUI), for instance. A GUI is presented according to an executable code. To adjust resource settings of multiple, different resources, the user accesses multiple, different GUIs. Accessing multiple different GUIs to adjust the resource settings for multiple resources is confusing for the user, takes time, and diminishes the user experience.

The electronic device includes location determination logic that enables the electronic device to determine a location of the electronic device. The location determination logic includes executable code, circuitry, or a combination thereof. The executable code is executable code of a network manager that manages connections to different networks, for instance. The circuitry is a network interface device, a sensor, or a combination thereof. The sensor is a radar, a time of flight sensor, a light sensor, an accelerometer, a temperature sensor, a Global Positioning Satellite (GPS) sensor, a wireless transceiver, or other suitable sensor for determining location.

While the electronic device might utilize the location determination logic to adjust resource settings, constant sampling of the location determination logic increases power consumption by the electronic device. In some instances, an accuracy of the location determination logic within structures is reduced. The reduced accuracy results in an incorrect adjustment to a resource setting, diminishing the user experience.

This description describes an electronic device that includes a photosensor to determine changes to lighting within a location of the electronic device. The photosensor measures a lighting intensity, a lighting color temperature, a lighting chromaticity, a lighting flickering frequency, a proximity of the electronic device to a lighting source, other measurable attributes of the lighting, or a combination thereof. Utilizing the photosensor measurements, the electronic device determines a first delta value of a first lighting attribute and a second delta value of a second lighting attribute of a location. The electronic device determines whether the electronic device has moved from a first location to a second location based on the first delta value and the second delta value. In some examples, the electronic device uses an elapsed time to determine whether the electronic device has moved from the first location to the second location or to a third location. In other examples, the electronic device determines a correlation between the first delta value and the second delta value and multiple locations. The electronic device determines a location of the electronic device by comparing the different correlations of the multiple locations. In response to the location determination, the electronic device adjusts a resource setting.

By utilizing the photosensor, the electronic device reduces power consumption by disabling constant sampling of the other location determination logic. Utilizing the photosensor to enable or disable the multiple resources enhances the user experience because the user does not have to adjust resource settings manually. The photosensor enhances an ability of the electronic device to determine a location within a structure. The enhanced location determination enhances an accuracy of adjustments to resource settings by the electronic device, thereby enhancing the user experience.

In some examples in accordance with the present description, an electronic device is provided. The electronic device includes a photosensor and a controller. The controller determines a first delta value and a second delta value via the photosensor. The first delta value is associated with a first lighting attribute of a first location, and the second delta value is associated with a second lighting attribute of the first location. The controller determines if the electronic device has moved from the first location to a second location based on the first delta value and the second delta value.

In other examples in accordance with the present description, an electronic device is provided. The electronic device includes a photosensor and a controller. The controller determines a first delta value, a second delta value, a third delta value, and a fourth delta value via the photosensor. The first delta value and the third delta value are associated with a first lighting attribute of the lighting, and the second delta value and the fourth delta value are associated with a second lighting attribute of the lighting. The controller enables a timer in response to a determination that the first delta value is within a first attribute range and the second delta value is within a second attribute range and determines an elapsed time of the timer in response to a determination that the third delta value is outside the first attribute range and the fourth delta value is outside the second attribute range. In response to the elapsed time being within a first time range, the controller determines the electronic device has moved from a first location to a second location, and in response to the elapsed time being within a second time range, the controller determines the electronic device has moved from the first location to a third location.

In yet other examples in accordance with the present description, a non-transitory machine-readable medium is provided. The term "non-transitory," as used herein, does not encompass transitory propagating signals. The non-transitory machine-readable medium stores machine-readable instructions, which, when executed by a controller, cause the controller to determine a first delta value and a second delta value. The first delta value is associated with a first lighting attribute of a photosensor, and the second delta value is associated with a second lighting attribute of the lighting. In response to the first delta value being within a first attribute range and the second delta value being within a second attribute range, the machine-readable instructions, when executed by the controller, cause the controller to determine correlations between the first and the second delta values and multiple locations and compare the correlations to determine in which location of the multiple locations the electronic device is located.

Figure 1B:
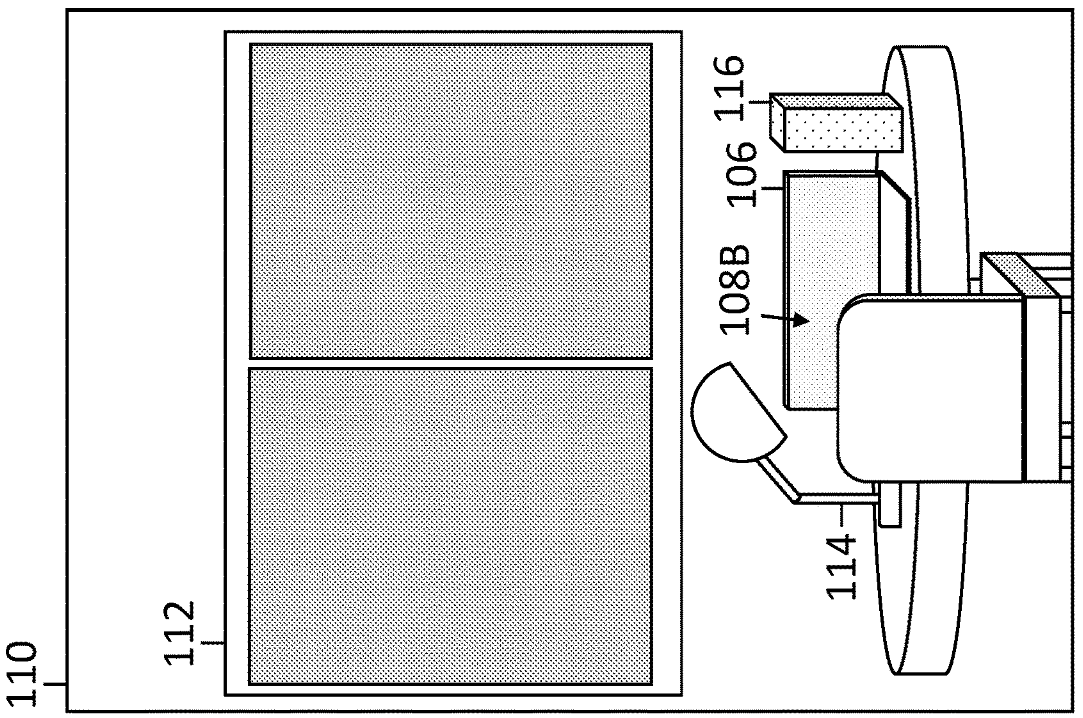

Referring now to FIGS. 1A and 1B, block diagrams showing an electronic device 106 in locations 100, 110 are provided, in accordance with various examples. The electronic device 106 is a desktop, a laptop, a notebook, a tablet, a smartphone, or other computing device including a photosensor (not explicitly shown). A location 100 is a first location of the electronic device 106. The location 100 is a classroom, an auditorium, or a conference room, for example. A location 110 is a second environment of the electronic device 106. The location 110 is an office, a library, or a room of a residential building, for example.

Referring now to FIG. 1A, a block diagram showing the electronic device 106 in the location 100 is provided, in accordance with various examples. The location 100 includes lighting sources 102, 104, and the electronic device 106. The electronic device 106 includes a display device 108A. The display device 108A is a liquid crystal display (LCD) device, a light-emitting diode (LED) display device, a quantum dot (QD) display device, an organic LED (OLED) display device, a microLED display device, a plasma display device, or any suitable display device for displaying data of the electronic device 106.

In various examples, the location 100 is a classroom, an auditorium, or a conference room. The lighting source 104 is disabled while the lighting source 102 is enabled. The electronic device 106 utilizes measurements of the photosensor to determine that the electronic device 106 is within the location 100. In response to the determination that the electronic device 106 is within the location 100, a setting of the display device 108A is adjusted. The setting of the display device 108A includes an enabled state, an intensity, a contrast, a color format, a sharpness, a language, a transparency, a rotation, a dimension, an aspect ratio, or a combination thereof. The color format, as used herein, adjusts a color, the intensity, the contrast, the sharpness, or a combination thereof. In response to the determination that the electronic device 106 is within the location 100, the color format of the display device 108A is adjusted, for example.

Referring now to FIG. 1B, a block diagram showing the electronic device 106 in the location 110 is provided, in accordance with various examples. The location 110 includes the electronic device 106 and lighting sources 112, 114. The electronic device 106 includes a display device 108B and an audio device 116. The display device 108B is the display device 108A, for example. The audio device 116 is any suitable device for receiving or transmitting audio signals. The audio device 116 is a speaker, for example.

In various examples, the location 110 is an office, a library, or a residential room. The lighting source 112 is disabled while the lighting source 114 is enabled. The electronic device 106 utilizes measurements of the photosensor to determine that the electronic device 106 is within the location 110. In response to the determination that the electronic device 106 is within the location 110, a setting of the display device 108B, a setting of the audio device 116, or a combination thereof, is adjusted. The setting of the audio device 116 includes a volume, an enabled state, or a combination thereof. In response to the determination that the electronic device 106 is within the location 100, the color format of the display device 108A is adjusted and the audio device 116 is enabled, for example.

Referring again to FIGS. 1A and 1B, the display device 108A and the display device 108B are referred to collectively as a display device 108. While not explicitly shown, in some examples, the electronic device 106 includes controllers, network interfaces, antennas, radios, video adapters, sound cards, local buses, power sources, storage devices, other I/O devices (e.g., a mouse, a speaker, a microphone, an image sensor), location determination logic, or a combination thereof. In some examples, the electronic device 106 includes electrical connections to the display device 108 from a controller. The controller is a central processing unit (CPU), a graphics processing unit (GPU), a system on a chip (SoC), an image signal processor (ISP), or a field programmable gate array (FPGA), for example. The controller of the electronic device 106 executes executable code of the electronic device 106. When executed by the controller, the executable code drives electronic circuitry of the display device 108, for example.

In various examples, the electronic device 106 includes a non-transitory machine-readable medium storing machine-readable instructions, which, when executed by the controller, cause the controller to determine a first delta value and a second delta value. The first delta value is associated with a first lighting attribute of the lighting, and the second delta value is associated with a second lighting attribute of the lighting. The first lighting attribute is a lighting intensity, a lighting color temperature, a lighting chromaticity, a lighting flickering frequency, a proximity of the electronic device 106 to a lighting source 102, 104, 112, 114, or a combination thereof. The second lighting attribute is a lighting intensity, a lighting color temperature, a lighting chromaticity, a lighting flickering frequency, a proximity of the electronic device 106 to a lighting source 102, 104, 112, 114, or a combination thereof. In various examples, the second lighting attribute is a different one of the lighting intensity, the lighting color temperature, the lighting chromaticity, the lighting flickering frequency, the proximity of the electronic device to the lighting source, or the combination thereof, than the first lighting attribute. The controller determines a delta value by calculating a difference between a first measurement of a lighting attribute and a second measurement of a lighting attribute. The first measurement is taken at a first time, and the second measurement is taken at a second time that is subsequent to the first time. For example, the controller samples the photosensor at five minute intervals. To determine the delta value for the lighting attribute, the controller subtracts a measurement of the lighting attribute at a quarter past an hour from a measurement of the lighting attribute at ten minutes past the hour. In some examples, the controller determines an absolute value of the delta value. In response to the first delta value being within a first attribute range and the second delta value being within a second attribute range, the machine-readable instructions, when executed by the controller, cause the controller to determine correlations between the first and the second delta values and multiple locations and compare the correlations to determine in which location of the multiple locations the electronic device 106 is located.

In various examples, the first attribute range and the second attribute range are determined by a location of the multiple locations, by a type of lighting source, by a location profile, or a combination thereof. The type of lighting source, as used herein, indicates an object emitting light. The type of lighting source may be natural or artificial. A natural type of lighting source is an object of nature that emits light. An artificial type of lighting source is a man-made object that emits light. The artificial type of lighting source includes incandescent lights, luminescent lights, gas discharge lights, or any other man-made light. The natural type of lighting source, the artificial type of lighting source, or a combination thereof, include sub-types, in various examples. Sub-types of the natural type of lighting source include a star, a moon, a volcano, lightning, bioluminescent biological organisms, or a combination thereof. Sub-types of the artificial type of lighting source include incandescent lights, luminescent lights, gas discharge lights, any other man-made light, or a combination thereof. In some examples, the sub-types of the lighting source include other sub-types. For example, luminescent artificial lighting sources include a neon light, a fluorescent light, a display device, or a combination thereof.

In some examples, the first attribute range and the second attribute range are determined based on the lighting source. For example, the first attribute range indicates that the lighting intensity of a first lighting source is between 80 and 200 lux, of a second lighting source is between 300 and 450 lux, and of a third lighting source is between 450 and 600 lux. The second attribute range indicates that the lighting color temperature of the first lighting source is between 2700 and 3300 Kelvin (K), of the second lighting source is between 5000 and 6500 K, and of the third lighting source is between 6500 and 9500 K. The first lighting source is an incandescent lighting source, the second lighting source is a fluorescent lighting source, and the third lighting source is a display screen, for example.

In another example, the first attribute range indicates that the lighting intensity of the first lighting source is between 1000 and 2000 lux, of the second lighting source is between 10000 and 25000 lux, and of the third lighting source is between 32000 and 100000 lux. The second attribute range indicates that the lighting color temperature of the first lighting source is between 4000 and 6000 K, of the second lighting source is between 5000 and 6000 K, and of the third lighting source is between 9000 to 11000 K. In some examples, the lighting color temperature is dependent on a time of day, a weather condition, or a combination thereof.

In other examples, the first attribute range and the second attribute range are determined by a location of the multiple locations. For example, the first attribute range indicates that the lighting intensity in a first location of the multiple locations is between 20 and 50 lux, in a second location of the multiple locations is between 100 and 150 lux, and in a third location of the multiple locations is between 250 and 300 lux. The second attribute range indicates that the lighting color temperature in the first location of the multiple locations is between 2400 and 2600 Kelvin (K), in the second location of the multiple locations is between 2700 and 2900 K, and in the third location of the multiple locations is between 2900 and 3100 K. The first location is a residential space, the second location is a commercial space, and the third location is a studio space, for example.

In various examples, the first attribute range and the second attribute range are determined by a location profile. The location profile is a variable, a list, an array, or other suitable data structure. The location profile stores the samples of the photosensor while the electronic device 106 is within a specified location, ranges of different lighting attributes while the electronic device 106 is within the specified location, time ranges that indicate an amount of time that the electronic device 106 is within the specified location, indicators for different resources of the electronic device 106, an indicator for the specified location, or a combination thereof. A range of a lighting attribute includes a lower limit, an upper limit, values in between the lower limit and the upper limit, an average of the values, or a combination thereof. A time range includes an average time, a lower time limit, an upper time limit, a total time, or a combination thereof, that the electronic device 106 is within the specified location, a transition time for the electronic device 106 to move to another location (e.g., from the location 100 to the location 110, from the location 110 to the location 100), or a combination thereof. An indicator for a resource of the electronic device 106 includes a resource identifier, whether the resource is enabled or disabled, a state of another setting of the resource (e.g., a volume of the audio device 116, a setting of the display device 108), a sampling rate of the resource, or a combination thereof. An indicator for the specified location includes a location identifier, a description of the location (e.g., office, home, classroom, residential, commercial, industrial, public, private, secure, unsecure, quiet, noisy), or a combination thereof.

For example, a first location profile includes a first intensity range, a first color temperature range, a first chromaticity range, a first flickering frequency range, a first type of lighting source, a first attribute range of proximities of the electronic device 106 to the first type of lighting source, a first time range, a first location indicator of the location 100, multiple resource indicators, or a combination thereof. A second location profile includes a second intensity range, a second color temperature range, a second chromaticity range, a second flickering frequency range, a second type of lighting source, a second attribute range of proximities of the electronic device 106 to the second type of lighting source, a second time range, a second location indicator of the location 110, multiple resource indicators, or a combination thereof. In some examples, a range for a lighting attribute of the location profile is a range of average measurements of the lighting attribute over a period of time. The period of time is specified at a time of manufacture, adjustable via a GUI, determined by the time ranges, or a combination thereof. In some examples, utilizing the GUI, a user adjusts a location profile of a specified location. For example, the user adjusts the ranges of the different lighting attributes while the electronic device 106 is within the specified location, the time ranges that indicate an amount of time that the electronic device 106 is within the specified location, the indicators for the different resources of the electronic device 106, the indicator for the specified location, or a combination thereof. In various examples, the electronic device 106 stores the pressure profiles on a storage device.

To determine correlations between the first delta value and the second delta value and the multiple locations, the controller assigns a correlation to the first delta value and the second delta value based on a relationship of the first delta value to the first attribute range and a relationship of the second delta value to the second attribute range. In some examples, the controller determines a first average of the first attribute range and a second average of the second attribute range, determines a first standard deviation from the first average of the first delta values and a second standard deviation from the second average for the second delta values, and determines a correlation of the first delta value and the second delta value to a first location of the multiple locations using the first standard deviation and the second standard deviation. In various examples, a data structure stores correlations, standard deviations for different lighting attributes, other suitable statistical relationship indicators, or a combination thereof. To determine the correlation of the first delta value and the second delta value to a first location of the multiple locations, the controller looks up the first average, the first standard deviation, the second average, the second standard deviation, the other suitable statistical relationship indicators, or the combination thereof, in a data structure to determine the correlation. The data structure is stored to a storage device of the electronic device 106, for example.

For example, a first average of the first attribute range is 140 lux for the location 100, and a second average of the second attribute range is 3000 K for the location 100. In response to the first delta value having a value of 180 lux, the controller determines that the first delta value is within two standard deviations of the first average of the first attribute range for the location 100. In response to the second delta value having a value of 3000K, the controller determines that the second delta value is equivalent to the second average of the second attribute range for the location 100. In response to the first delta value being within two standard deviations of the first average and the second delta value being equivalent to the second average, the controller assigns a first correlation of 1.5 to indicate a relationship between the first delta value and the second delta value and the location 100. A first average of the first attribute range is 375 lux for the location 110, and a second average of the second attribute range is 5750 K for the location 110. In response to the first delta value having a value of 180 lux, the controller determines that the first delta value is within ten standard deviations of the first average of the first attribute range for the location 110. In response to the second delta value having a value of 3000K, the controller determines that the second delta value is within 28 standard deviations of the second average of the second attribute range for the location 110. In response to the first delta value being within 10 standard deviations of the first average and the second delta value being within 28 standard deviations of the second average, the controller assigns a second correlation of 0.1 to indicate a relationship between the first delta value and the second delta value and the location 110.

In various examples, the controller compares the correlations to determine in which location of the multiple locations the electronic device 106 is located. For example, the controller compares the first correlation to the second correlation. In some examples, in response to a determination that the first correlation is greater than the second correlation, the controller determines the electronic device 106 is within the first location. In other examples, in response to a determination that the second correlation is greater than the first correlation, the controller determines the electronic device 106 is within the second location. In some examples, the controller enables a location determination logic to verify the location of the multiple locations in which the electronic device is located. For example, the controller enables an executable code, a GPS sensor, a wireless transceiver, a radar, a time of flight sensor, a light sensor, an accelerometer, a temperature sensor, an image sensor, or a combination thereof, to verify the location of the multiple locations.

Figure 2:
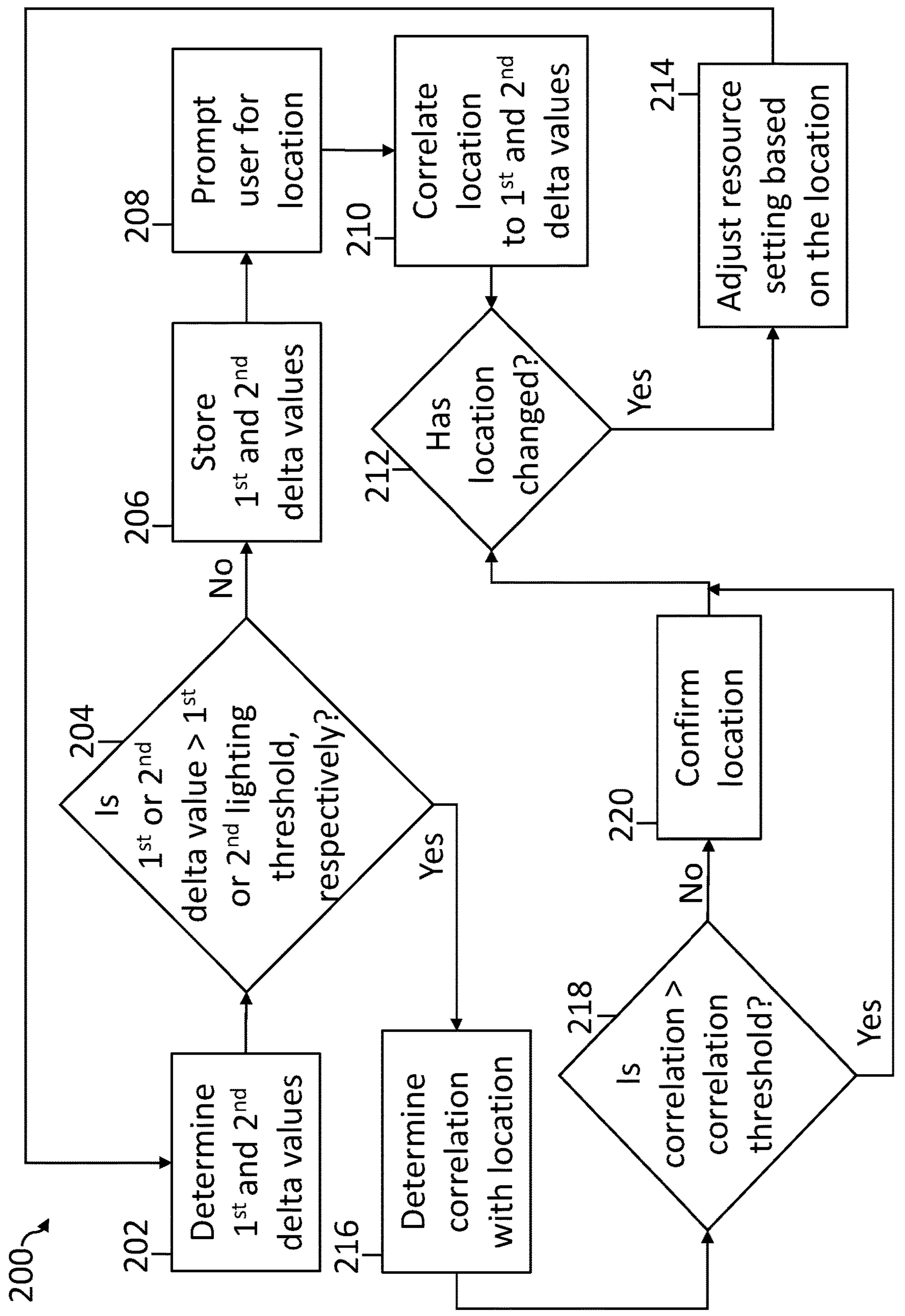
FIG. 2 is a flow diagram depicting a method for an electronic device for determining locations, in accordance with various examples.

Referring now to FIG. 2, a flow diagram showing a method 200 for an electronic device (e.g., the electronic device 106) for determining locations (e.g., the location 100, 110) is provided, in accordance with various examples. The method 200 includes determining a first delta value and a second delta value (202). The method 200 also includes determining whether the first delta value is greater than a first lighting attribute threshold or the second delta value is greater than a second lighting attribute threshold (204). In response to a determination that the first delta value is equivalent to or less than the first lighting attributed threshold or the second delta value is equivalent to or less than the second lighting attribute threshold, the method 200 additionally includes storing the first delta value and the second delta value (206). The method 200 also includes prompting the user for a location (208). The method 200 includes correlating the location to the first delta value and the second delta value (210). Additionally, the method 200 includes determining whether the location has changed (212). In response to a determination that the location has changed, the method 200 includes adjusting a resource setting based on the location (214). The method 200 includes returning to determine another first delta value and another second delta value.

In response to a determination that the first delta value is greater than the first lighting attributed threshold or the second delta value is greater than the second lighting attribute threshold, the method 200 additionally includes determining a correlation with a location (216). The method 200 includes determining whether the correlation is greater than a correlation threshold (218). In response to a determination that the correlation is equivalent to or less than the correlation threshold, the method 200 also includes confirming the location (220). In response to a determination that the correlation is greater than the correlation threshold or a confirmation of the location, the method 200 includes determining whether the location has changed (212).

In various examples, the method 200 includes determining the first delta value and the second delta value using the techniques described above with respect to FIGS. 1A and 1B. In some examples, to determine whether the first delta value is greater than the first lighting attribute threshold, the second delta value is greater than the second lighting attribute threshold, or a combination thereof, the method 200 includes comparing the first delta value, the second delta value, or a combination thereof, to a location profile of multiple location profiles, as described above with respect to FIGS. 1A and 1B or as described below with respect to FIG. 8. For example, the method 200 includes comparing a delta value associated with a lighting attribute to a lower limit of a range for the lighting attribute stored to the location profile. In response to a determination that the first delta value and the second delta value do not correspond to the location, the method 200 includes using the first delta value and the second delta value to generate a location profile for the user-provided location utilizing the techniques described above with respect to FIGS. 1A and 1B, for example. To adjust a resource setting based on the location, the method 200 includes enabling and disabling resources of the electronic device and adjusting a resource setting of a resource according to the settings stored to the location profile, for example.

In some examples, in response to a determination that a delta value associated with a lighting attribute is greater than the lower limit of a range for the lighting attribute stored to the location profile, the method 200 includes determining whether the delta value associated with the lighting attribute is less than an upper limit of the range for the lighting attribute stored to the location profile. In response to a determination that the delta value associated with the lighting attribute is less than the upper limit of the range for the lighting attribute stored to the location profile, the method 200 determines the correlation with the location. In various examples, in response to a determination that the delta value associated with the lighting attribute is greater than the upper limit of the range for the lighting attribute stored to the location profile, the method 200 compares the delta value to a different location profile to determine whether the first delta value or the second delta value is greater than a first lighting threshold or a second lighting threshold, respectively, of the different location profile.

In various examples, to determine whether the location has changed, the method 200 includes comparing the user-provided location to a current location of the electronic device. In response to a determination that the user-provided location does not differ from the current location, the method 200 includes generating multiple environment indicators for the current location, as described below with respect to FIG. 8, for example. In other examples, to determine whether the location has changed, the method 200 includes utilizing techniques described below with respect to FIG. 4, 5, 6, or 7.

Figure 3:
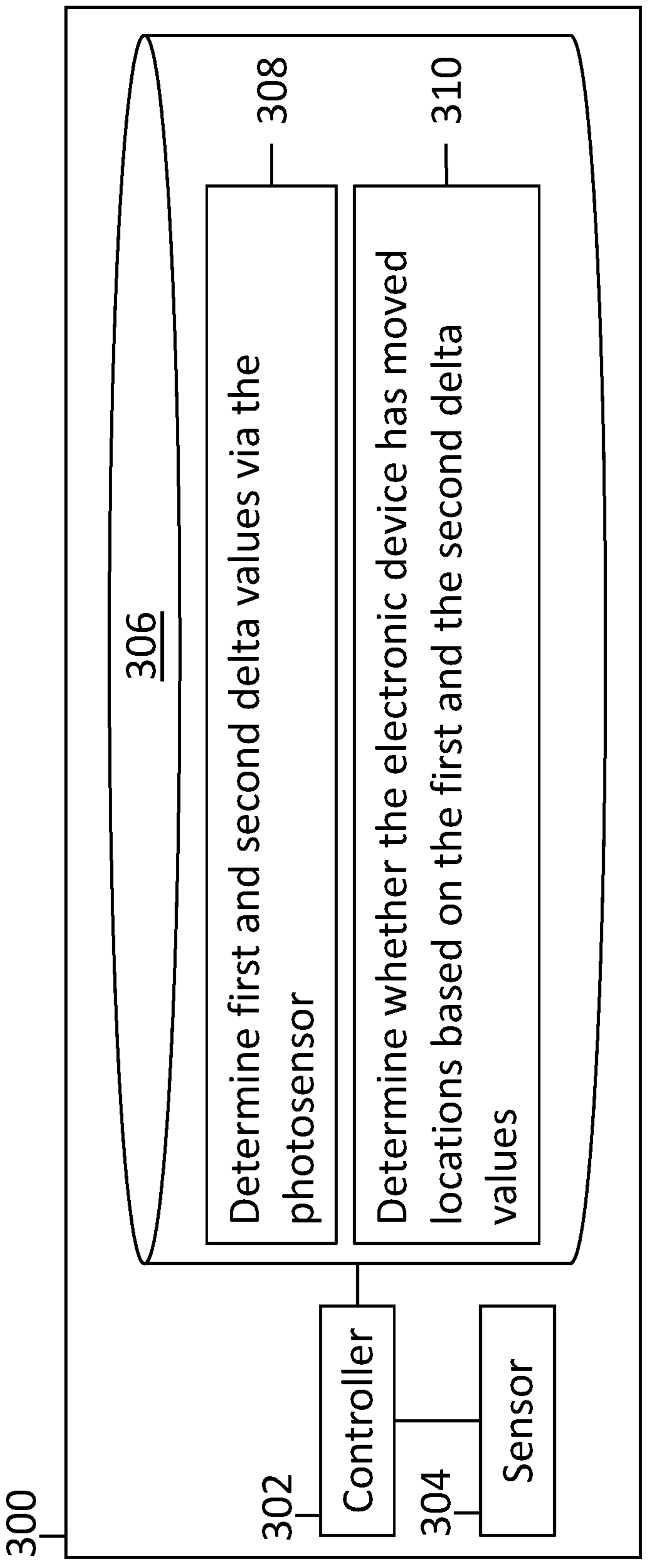
FIG. 3 is a block diagram depicting an electronic device for determining locations, in accordance with various examples.

Referring now to FIG. 3, a block diagram showing an electronic device 300 for determining locations is provided, in accordance with various examples. The electronic device 300 is the electronic device 106, for example. The electronic device 300 is the electronic device for performing the method 200, for example. The electronic device 300 includes a controller 302, a sensor 304, and a storage device 306. The controller 302 is a microprocessor, a microcomputer, a programmable integrated circuit, a programmable gate array, or other suitable device for managing operations of the electronic device 300 or a component or multiple components of the electronic device 300. For example, the controller 302 is a central processing unit (CPU), a graphics processing unit (GPU), an embedded security processor (EpSC), or an embedded artificial intelligence (eAI). The sensor 304 is a photosensor or other suitable sensor that measures changes in lighting. The sensor 304 is a photodiode, a photo-resistor, a photo-transistor, or other suitable photoelectric sensor, for example. In some examples, the sensor 304 is an image sensor. The storage device 306 is a hard drive, a solid-state drive (SSD), flash memory, random access memory (RAM), or other suitable memory for storing data or machine-readable instructions of the electronic device 300.

In various examples, the controller 302 is coupled to the sensor 304 and the storage device 306. The sensor 304 is coupled to the controller 302. The storage device 306 is coupled to controller 302. While not explicitly shown, in some examples, the electronic device 300 includes network interface devices, video adapters, sound cards, local buses, peripheral devices (e.g., a keyboard, a mouse, a touchpad, a speaker, a microphone, a display device), other location determination logic, other resources, or a combination thereof. The network interface devices, video adapters, sounds cards, peripheral devices, other location determination logic couple to the controller 302, the sensor 304, the storage device 306, or a combination thereof, via the local buses, for example.

In some examples, the storage device 306 stores machine-readable instructions, which, when executed by the controller 302, cause the controller 302 to perform some or all of the actions attributed herein to the controller 302. The machine-readable instructions are the machine-readable instructions 308, 310, for example. In various examples, the machine-readable instructions 308, 310, when executed by the controller 302, cause the controller 302 to perform some or all of the method 200.

In various examples, the machine-readable instructions 308, 310, when executed by the controller 302, cause the controller 302 to determine a location of the electronic device 300. The machine-readable instruction 308, when executed by the controller 302, causes the controller 302 to determine a first delta value and a second delta value via the sensor 304. As described above with respect to FIGS. 1A and 1B, the first delta value is associated with a first lighting attribute of a first location (e.g., the location 100, 110), and the second delta value is associated with a second lighting attribute of the first location. The second lighting attribute is different from the first lighting attribute. The machine-readable instruction 310, when executed by the controller 302, causes the controller 302 to determine whether the electronic device 300 has moved locations based on the first delta value and the second delta value.

In some examples, the electronic device 300 includes multiple photosensors. The controller 302 determines the first delta value by calculating an average of the first delta value for each photosensor of the multiple photosensors. The controller 302 determines the second delta value by calculating an average of the second delta value for each photosensor of the multiple photosensors. In various examples, prior to calculating the average of the first delta values or the average of the second delta values, the controller 302 determines a standard deviation for the first delta value for each photosensor of the multiple photosensors from an average for a first attribute range of the first lighting attribute or a standard deviation for the second delta value for each photosensor of the multiple photosensors from an average for a second attribute range of the second lighting attribute, respectively. In response to the standard deviation for the first delta value or the second delta value for a photosensor of the multiple photosensors deviating from the average for the first attribute range or the average for the second attribute range, respectively, by an amount greater than a first specified threshold or a second specified threshold, respectively, the controller 302 determines that the photosensor is obscured or malfunctioning and does not include the first delta value for the photosensor in the calculation of the average of the first delta values or the second delta value for the photosensor in the calculation of the average of the second delta values.

In various examples, the controller 302 uses the techniques described above with respect to FIGS. 1A and 1B or 2 to determine whether the electronic device 300 has moved locations based on the first delta value and the second delta value. In some examples, in response to a determination that the electronic device 300 has not moved locations, the controller 302 determines whether an environment of the location has changed utilizing the techniques described above with respect to FIG. 2 or described below with respect to FIG. 8.

In some examples, in response to a determination that the electronic device 300 has moved from the first location to the second location, the controller 302 causes the image sensor to capture an image. The controller 302 verifies the second location utilizing the image.

Including the sensor 304 enhances an ability of the electronic device 300 to determine a location (e.g., the location 100, 110), an environment of the location, or a combination thereof, within a structure. The enhanced location determination enhances an accuracy of a selection of resource settings by the electronic device 300, thereby enhancing the user experience. Utilizing the sensor 304 to determine lighting attributes and adjusting between the different resource settings in response to changes in the lighting attributes enhances the user experience because the user does not have to adjust the settings manually.

Figure 4:
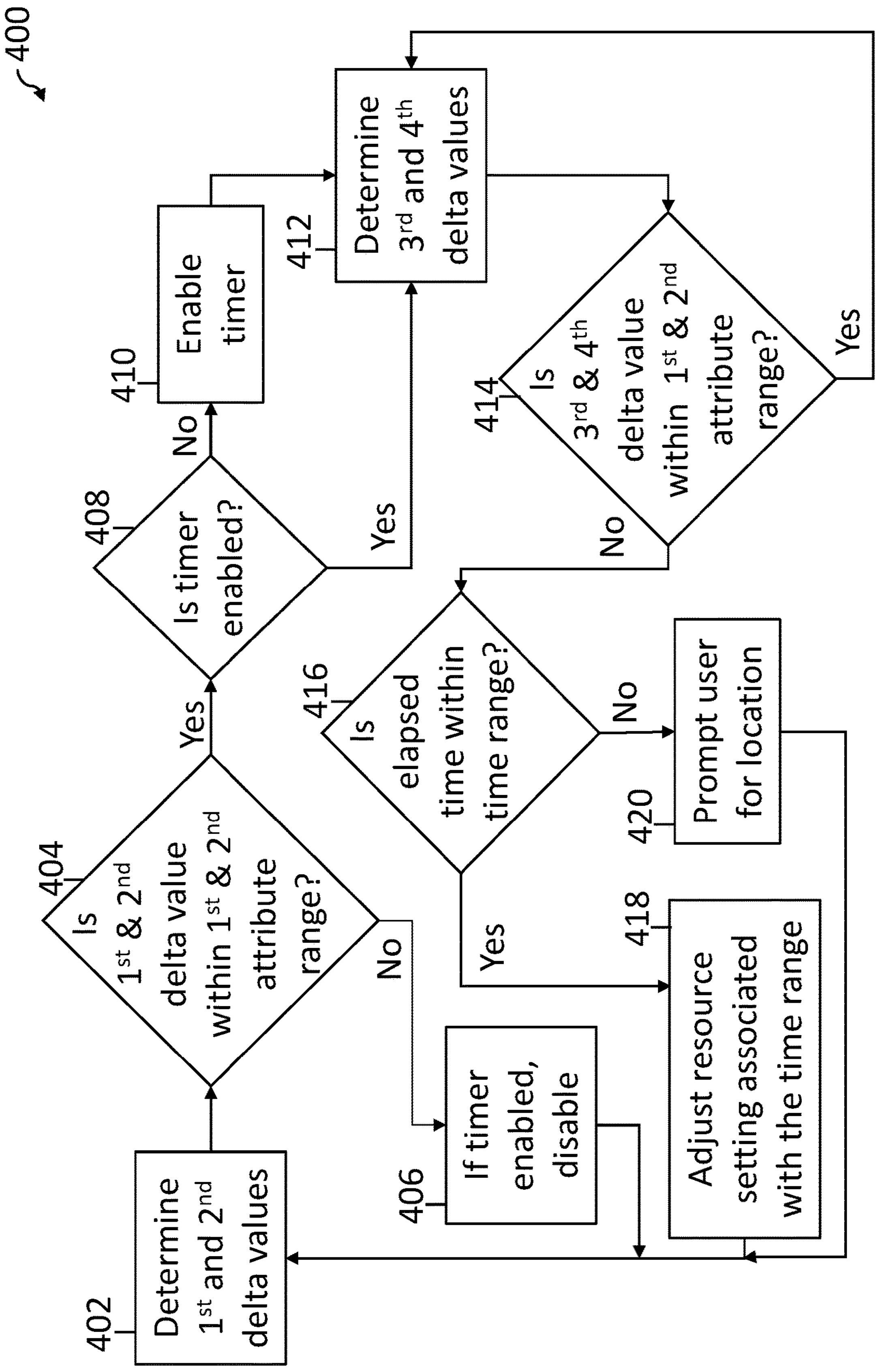
FIG. 4 is a flow diagram depicting a method for an electronic device for determining locations, in accordance with various examples.

Referring now to FIG. 4, a flow diagram showing a method 400 for an electronic device (e.g., the electronic device 106, 300) for determining locations (e.g., the location 100, 110) is provided, in accordance with various examples. The method 400 includes determining a first delta value and a second delta value (402). The method 400 also includes determining whether the first delta value is within a first attribute range and whether the second delta value is within a second attribute range (404). In response to a determination that the first delta value is within the first attribute range and the second delta value is within the second attribute range, the method 400 additionally includes disabling an enabled timer (406). The method 400 includes returning to determine a first delta value and a second delta value (402).

In response to a determination that the first delta value is within the first attribute range and the second delta value is within the second attribute range, the method 400 additionally includes determining whether the timer is enabled (408). In response to a determination that the timer is not enabled, the method 400 includes enabling the timer (410). The method 400 determines a third delta value and a fourth delta value (412). The method 400 also includes determining whether the third delta value is within the first attribute range and the fourth delta value is within the second attribute range, respectively (414). In response to a determination that the third delta value is within the first attribute range and the fourth delta value is within the second attribute range, the method 400 includes returning to determine a third delta value and a fourth delta value (412).

In response to a determination that the third delta value is outside the first attribute range and the fourth delta value is outside the second attribute range, the method 400 determines whether an elapsed time is within a time range (416). In response to a determination that the elapsed time is outside the time range, the method 400 additionally includes prompting the user for a location (420). The method 400 also includes returning to determine a first delta value and a second delta value (402).

In response to a determination that the elapsed time is within the time range, the method 400 additionally includes adjusting a resource setting associated with the time range (418). The method 400 also includes returning to determine a first delta value and a second delta value (402).

In various examples, the method 400 includes determining the first delta value, the second delta value, the third delta value, and the fourth delta value using the techniques described above with respect to FIGS. 1A and 1B. In some examples, to determine whether the first delta value or the third delta value is within the first attribute range, the second delta value or the fourth delta value is within the second attribute range, or a combination thereof, the method 400 includes comparing the first delta value or the third delta value to a first range of a first attribute and the second delta value or the fourth delta value to a second range of a second attribute, respectively, for a location, as described above with respect to FIGS. 1A and 1B.

As described above with respect to FIGS. 1A and 1B, the time range includes the average time, the lower time limit, the upper time limit, the total time, or the combination thereof, that the electronic device is within the specified location, a transition time for the electronic device to move to another location, or a combination thereof. In some examples, the time range of a location profile includes multiple transition times for the electronic device to move to different locations. For example, the time range for a first location includes a first transition time for the electronic device to move from the first location to a second location and a second transition time for the electronic device to move from the first location to a third location. The method 400 includes determining whether the elapsed time is within the total time added to the first transition time or within the total time added to the second transition time. In response to a determination that the elapsed time is within the total time added to the first transition time, the method 400 includes adjusting a resource setting in accordance with a location profile for the location profile for the second location. In response to a determination that the elapsed time is within the total time added to the second transition time, the method 400 includes adjusting a resource setting in accordance with a location profile for the location profile for the third location.

In some examples, in response to a determination that the elapsed time is outside the time range, the method 400 includes comparing the user-provided location to a current location of the electronic device. In response to a determination that the user-provided location does not differ from the first location, the method 400 includes generating multiple environment indicators for the first location, as described below with respect to FIG. 8. In response to a determination that the user-provided location differs from the first location, the method 400 includes generating multiple environment indicators and an additional transition time for the first location, as described below with respect to FIG. 8, a new location profile, as described above with respect to FIGS. 1A and 1B, or a combination thereof.

Figure 5:
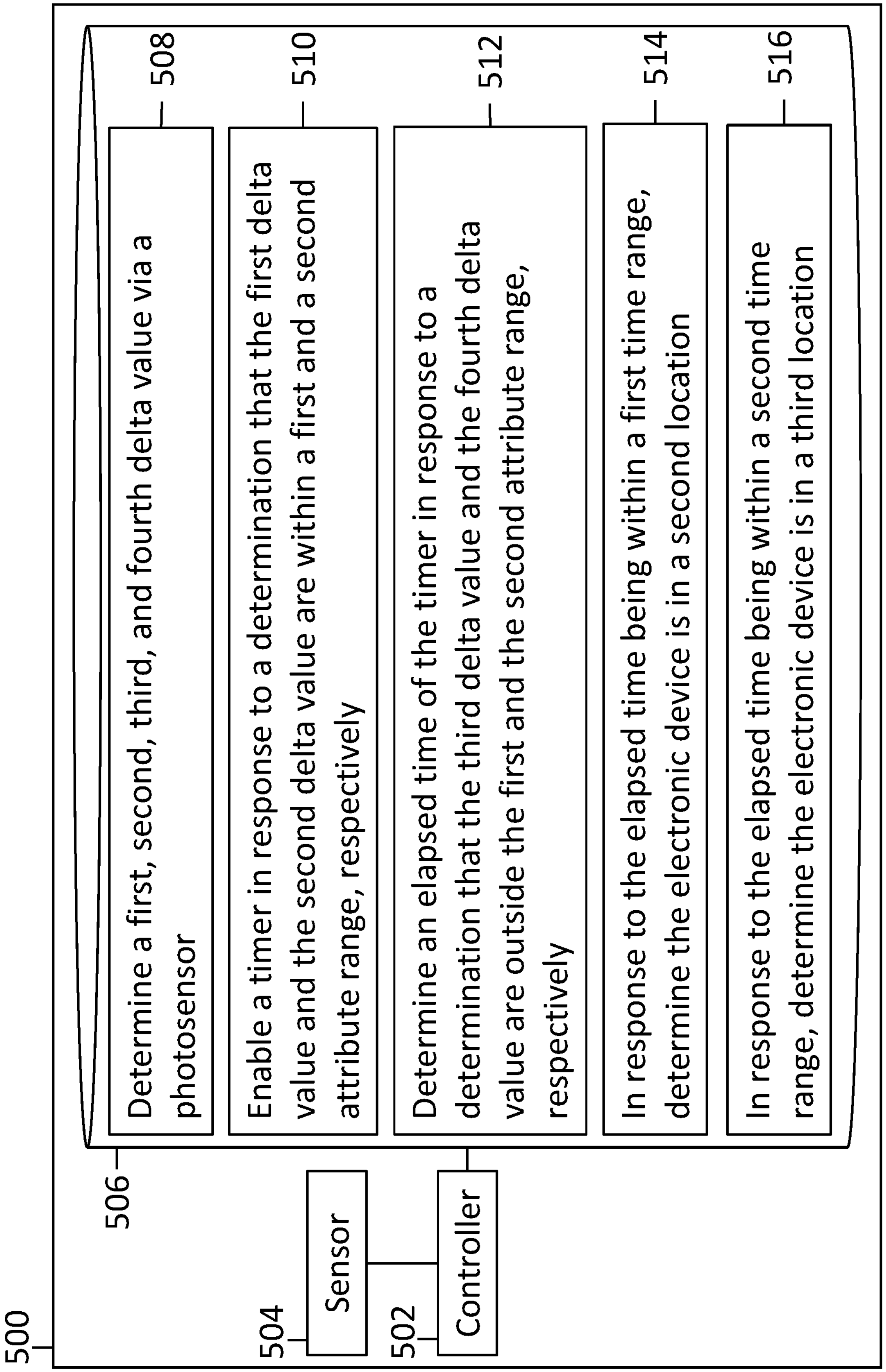
FIG. 5 is a block diagram depicting an electronic device for determining locations, in accordance with various examples.

Referring now to FIG. 5, a block diagram showing an electronic device 500 for determining locations is provided, in accordance with various examples. The electronic device 500 is the electronic device 106, 300, for example. The electronic device 500 performs the method 400, for example. The electronic device 500 includes a controller 502, a sensor 504, and a storage device 506. The controller 502 is the controller 302, for example. The sensor 504 is the sensor 304, for example. The storage device 506 is the storage device 306, for example. In various examples, the controller 502, the sensor 504, and the storage device 506 are coupled as described above with respect to FIG. 3.

In some examples, the storage device 506 stores machine-readable instructions, which, when executed by the controller 502, cause the controller 502 to perform some or all of the actions attributed herein to the controller 502. The machine-readable instructions are the machine-readable instructions 508, 510, 512, 514, 516, for example. The machine-readable instructions 508, 510, 512, 514, 516, when executed by the controller 502, cause the controller 502 to perform some or all of the method 400, for example.

In various examples, the machine-readable instructions 508, 510, 512, 514, 516, when executed by the controller

502, cause the controller 502 to determine a location of the electronic device 500. The machine-readable instruction 508, when executed by the controller 502, causes the controller 502 to determine a first delta value, a second delta value, a third delta value, and a fourth delta value via the photosensor. The first delta value and the third delta value are associated with a first lighting attribute of the lighting, and the second delta value and the fourth delta value are associated with a second lighting attribute of the lighting. In response to a determination that the first delta value is within a first attribute range and the second delta value is within a second attribute range, the machine-readable instruction 510, when executed by the controller 502, causes the controller 502 to enable a timer. In response to a determination that the third delta value is outside the first attribute range and the fourth delta value is outside the second attribute range, the machine-readable instruction 512, when executed by the controller 502, causes the controller 502 to determine an elapsed time of the timer. In response to the elapsed time being within a first time range, the machine-readable instruction 514, when executed by the controller 502, causes the controller 502 to determine the electronic device 500 has moved from a first location to a second location. In response to the elapsed time being within a second time range, the machine-readable instruction 516, when executed by the controller 502, causes the controller 502 to determine the electronic device 500 has moved from the first location to a third location.

In various examples, the third delta value and the fourth delta value are determined subsequent in time to the first delta value and the second delta value, respectively. In some examples, the controller 502 adjusts a resource setting from a first setting to a second setting in response to the electronic device 500 moving from the first location to the second or the third location. For example, in the first location, a resource setting indicates an audio device (e.g., the audio device 116) is enabled and has a first volume, in the second location, the resource setting indicates the audio device is disabled, and in the third location, the resource setting indicates the audio device is enabled and has a second volume. In various examples, the controller 502 retrieves the second setting from a location profile for the second or the third location.

Figure 6:
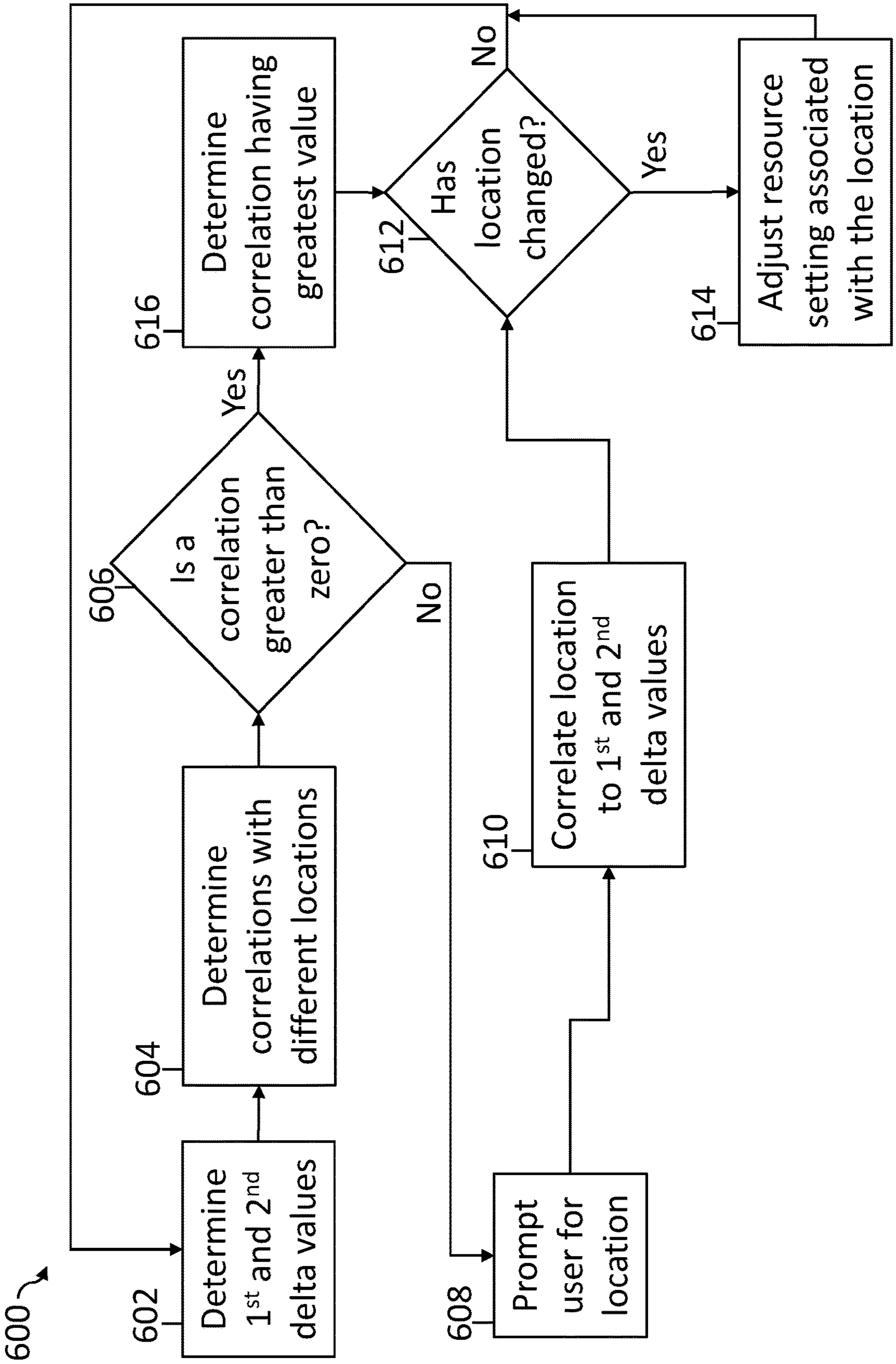
FIG. 6 is a flow diagram depicting a method for an electronic device for determining locations, in accordance with various examples.

Referring now to FIG. 6, a flow diagram showing a method 600 for an electronic device (e.g., the electronic device 106, 300, 500) for determining locations of the electronic device is provided, in accordance with various examples. The method 600 includes determining a first delta value and a second delta value (602). The method 600 also includes determining correlations with different locations (604). Additionally, the method 600 includes determining whether a correlation of multiple correlations is greater than zero (606). In response to a determination that none of the multiple correlations are greater than zero, the method 600 includes prompting the user for a location (608). The method 600 includes correlating the location to the first delta value and the second delta value (610). Additionally, the method 600 includes determining whether a location has changed (612). In response to a determination that the location has changed, the method 600 includes adjusting a resource setting associated with the location (614).

In response to a determination that the correlation of the multiple correlations is greater than zero, the method 600 additionally includes comparing the multiple correlations to determine which correlation of the multiple correlations has the greatest value (616). The method 600 also includes determining whether a location has changed (612).

In various examples, the method 600 includes determining the delta values and the correlations utilizing the techniques described above with respect to FIGS. 1A and 1B. In some examples, in response to a determination that multiple correlations are greater than zero, the method 600 includes enabling other location determination logic of an electronic device (e.g., the electronic device 106, 300, 500). The method 600 includes determining whether a location indicated by the other location determination logic is equivalent to a location associated with the correlation of the multiple correlations. In other examples, in response to a determination that multiple correlations are greater than zero, the method 600 includes capturing an image by an image sensor of the electronic device. The method 600 includes determining whether a location indicated by the image indicates a location associated with the correlation of the multiple correlations.

Figure 7:
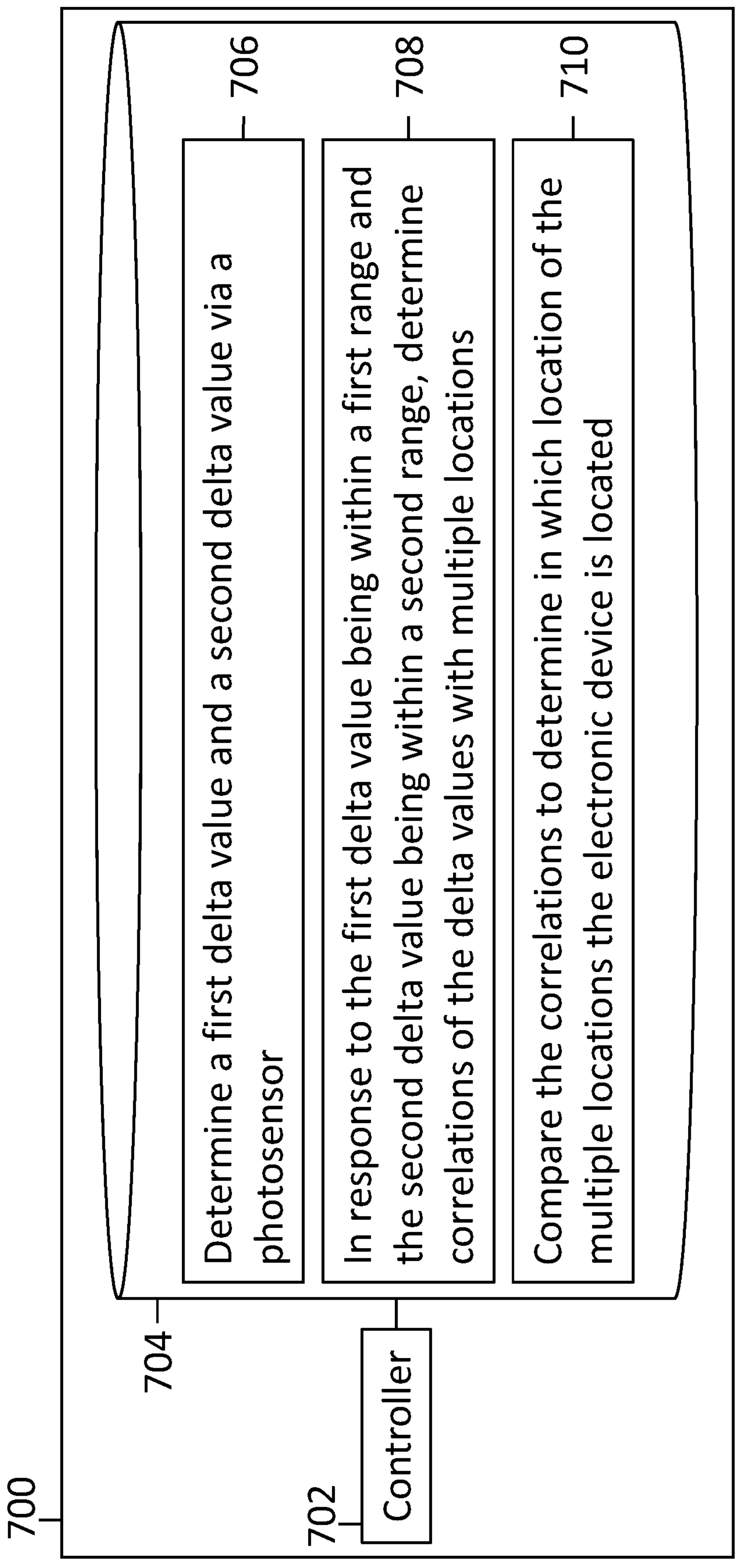
FIG. 7 is a block diagram depicting an electronic device for determining locations, in accordance with various examples.

Referring now to FIG. 7, a block diagram showing an electronic device 700 for determining locations is provided, in accordance with various examples. The electronic device 700 is the electronic device 106, 300, 500, for example. The electronic device 700 includes a controller 702 and a non-transitory machine-readable medium 704. The controller 702 is the controller 302, 502, for example. The non-transitory machine-readable medium 704 is the storage device 306, 506, for example.

In some examples, the controller 702 is coupled to the non-transitory machine-readable medium 704. The non-transitory machine-readable medium 704 stores machine-readable instructions, which, when executed by the controller 702, cause the controller 702 to perform some or all of the actions attributed herein to the controller 702. The machine-readable instructions are the machine-readable instructions 706, 708, 710, for example. The machine-readable instructions 706, 708, 710, when executed by the controller 702, cause the controller 702 to perform some or all of the method 600, for example.

In various examples, the machine-readable instructions 706, 708, 710, when executed by the controller 702, cause the controller 702 to determine locations of the electronic device 700. The machine-readable instruction 706, when executed by the controller 702, causes the controller 702 to determine a first delta value and a second delta value via a photosensor (e.g., the sensor 304, 504). In response to the first delta value being within a first attribute range and the second delta value being within a second attribute range, the machine-readable instruction 708, when executed by the controller 702, causes the controller 702 to determine correlations of delta values with multiple locations. The machine-readable instruction 710, when executed by the controller 702, causes the controller 702 to compare the correlations to determine in which location of the multiple locations the electronic device 700 is provided.

In various examples, the controller 702 determines the delta values and the correlations utilizing the techniques described above with respect to FIGS. 1A and 1B. In some examples, the location is associated with multiple environments, as described below with respect to FIG. 8. The controller 702 determines correlations between the delta values and each environment of the location. For example, the controller 702 determines a first correlation between the first delta value and the second delta value and the first environment associated with the location and determines a second correlation between the first delta value and the second delta value and the second environment associated with the location. In response to the first correlation exceeding the second correlation, the controller 702 enables a first resource setting of the electronic device 700, where the first resource setting is associated with the first environment. In response to the second correlation exceeding the first correlation, the controller 702 enables a second resource setting of the electronic device 700, where the second resource setting is associated with the second environment.

In some examples, the controller 702 analyzes an image captured by an image sensor of the electronic device 700. In response to the image indicating the first environment, the controller 702 enables a first resource setting of the electronic device 700, where the first resource setting is associated with the first environment. In response to the image indicating the second environment, the controller 702 enables a second resource setting of the electronic device 700, where the second resource setting is associated with the second environment.

Figure 8B:
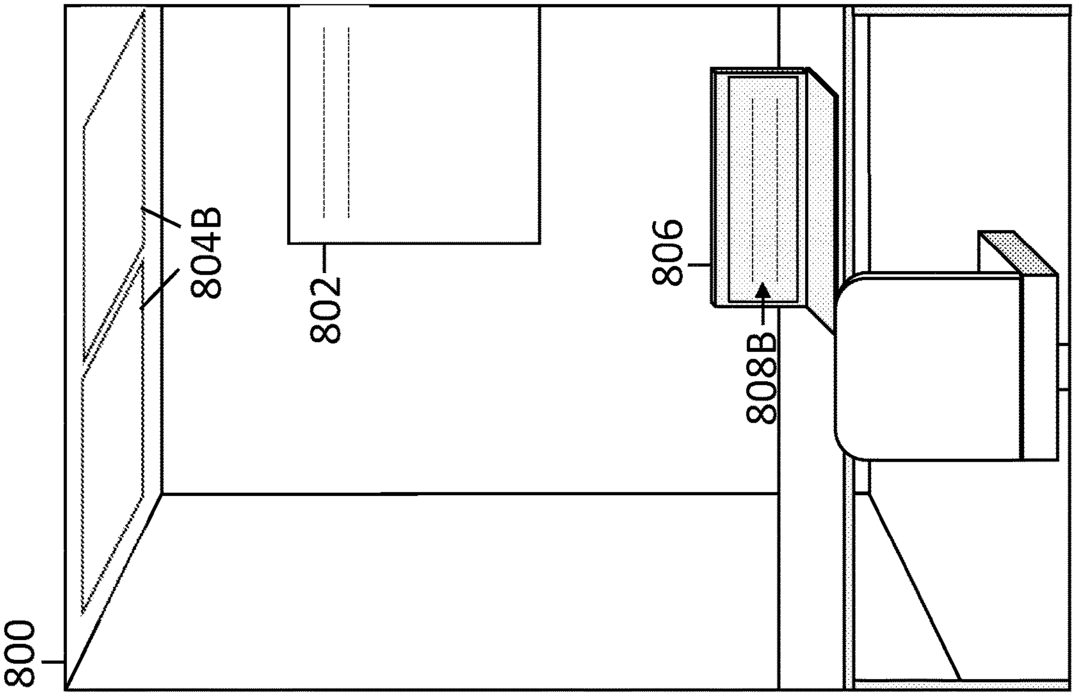
FIGS. 8A and 8B are block diagrams depicting an electronic device in a location having different environments, in accordance with various examples.
Figure 8A:
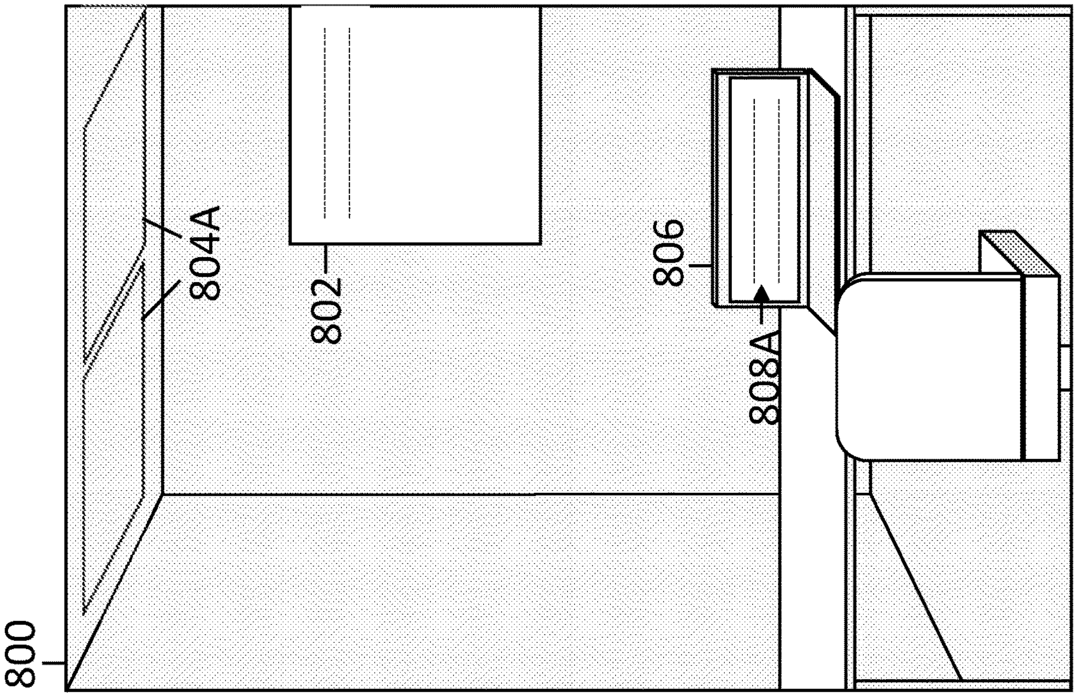

Referring now to FIGS. 8A and 8B, block diagrams of an electronic device 806 in a location 800 having different environments is shown, in accordance with various examples. The electronic device 806 is the electronic device 106, 300, 500, 700, for example. A location 800 is a location of the electronic device 806. The location 800 is a classroom, an auditorium, or a conference room, for example.

Referring now to FIG. 8A, a block diagram showing the electronic device 806 in the location 800 is provided, in accordance with various examples. The location 800 includes lighting sources 802, 804A, and the electronic device 806. A lighting source 802 is the lighting source 102, for example. The lighting source 804A is the lighting source 104, for example. The electronic device 806 includes a display device 808A. The display device 808A is the display device 108, for example.

In various examples, the lighting source 804A is disabled while the lighting source 802 is enabled. The electronic device 806 utilizes measurements of a photosensor to determine that the electronic device 806 is within a first environment of the location 800. In response to the determination that the electronic device 806 is within the first environment of the location 800, a setting of the display device 808A is adjusted.

Referring now to FIG. 8B, a block diagram showing the electronic device 806 in the location 800 is provided, in accordance with various examples. The location 800 includes the electronic device 806 and lighting sources 802, 804B. The electronic device 806 includes a display device 808B. The display device 808B is the display device 808A, for example.

In various examples, the lighting source 804B is enabled and the lighting source 802 is enabled. The electronic device 806 utilizes measurements of a photosensor to determine that the electronic device 806 is within a second environment of the location 800. In response to the determination that the electronic device 806 is within the second environment of the location 800, the setting of the display device 808B is adjusted.

As described above with respect to FIGS. 1A and 1B, the first attribute range and the second attribute range are determined by a specified location of the multiple locations, by a type of lighting source, by a location profile, or a combination thereof. In some examples, the location profile includes multiple types of lighting sources, a state of a type of lighting source of the multiple types of lighting sources, a time threshold for the state of the type of lighting source, different ranges of the electronic device 806 to the multiple types of lighting sources, multiple ranges of lighting attributes, multiple resource indicators, an indicator for the specified location, or a combination thereof. The indicator for the specified location includes a location identifier, a description of the location (e.g., office, home, classroom, residential, commercial, industrial, public, private, secure, unsecure, quiet, noisy), an environment identifier, or a combination thereof. Environment, as used herein, refers to a lighting condition of a location. The lighting condition describes the states of the multiple types of lighting sources. For example, in response to a location including three types of lighting sources, the location indicator includes multiple environment indicators. Each environment indicator describes a different lighting condition. For example, two types of lighting sources of the multiple types of lighting sources being enabled are associated with a first environment indicator, and three types of lighting sources of the multiple types of lighting sources being enabled are associated with a second environment indicator.

For example, the location profile includes two types of lighting sources. For a first time threshold, the first type and the second type of lighting source is enabled. The first time threshold is associated with the two types of lighting sources, a first intensity range, a first color temperature range, a first chromaticity range, a first flickering frequency range, a first attribute range of proximities of the electronic device 806 to the first type of lighting source, a second attribute range of proximities of the electronic device 806 to the second type of lighting source, a first location indicator of the location 800, multiple resource indicators, or a combination thereof. For a first time threshold, the first type and the second type of lighting source is enabled. The first time threshold is associated with the two types of lighting sources, a first intensity range, a first color temperature range, a first chromaticity range, a first flickering frequency range, a first attribute range of proximities of the electronic device 806 to the first type of lighting source, a second attribute range of proximities of the electronic device 806 to the second type of lighting source, a first location indicator of the location 800, multiple resource indicators, or a combination thereof.

In some examples, the electronic device 806 uses a machine learning technique to generate a location profile. The machine learning technique is a supervised learning technique such as logistic regression, k-Nearest Neighbor (kNN), or decision tree, an unsupervised learning technique such as K-means, a reinforced learning technique such as Markov decision process, or a combination thereof. Using the machine learning technique, the electronic device 806 determines relationships between samples of the photosensor while the electronic device 806 is within a specified location, ranges of different lighting attributes while the electronic device 806 is within the specified location, time ranges that indicate an amount of time that the electronic device 806 is within the specified location, indicators for different resources of the electronic device 806, an indicator for the specified location, or a combination thereof. Based on the relationships, the electronic device 806 generates the location profile. In various examples, in response to the location 800 including multiple types of lighting sources, a state of a type of lighting source of the multiple types of lighting sources, a time threshold for the state of the type of lighting source, different ranges of the electronic device 806 to the multiple types of lighting sources, multiple ranges of lighting attributes, the electronic device 806 generates a location profile having multiple environment indicators for the location 800.

Utilizing the pressure differentials, correlation coefficients, or a combination thereof, enhances an ability of the electronic device 106, 300, 500, 700, 806 to determine a location (e.g., the location 100, 110, 800). The enhanced location determination enhances an accuracy of adjustments to resource settings by the electronic device 106, 300, 500, 700, 806, thereby enhancing the user experience. Utilizing the first delta value, the second delta value, the correlation, or a combination thereof, and adjusting resource settings in response to the determined location enhances the user experience because the user does not have to adjust the settings manually. By utilizing the lighting attributes, the electronic device 106, 300, 500, 700, 806 reduces power consumption by disabling constant sampling of the other location determination logic.

Unless infeasible, some or all of the method 200, 400, 600 may be performed by a controller (e.g., the controller 302, 502, 702) concurrently or in different sequences and by circuitry of an electronic device (e.g., the electronic device 106, 300, 500, 700, 806), execution of machine-readable instructions of the electronic device, or a combination thereof. For example, the method 200, 400, 600 is implemented by machine-readable instructions stored to a storage device (e.g., the storage device 306, 506, the non-transitory machine-readable medium 704, or another storage device not explicitly shown of the electronic device), circuitry (some of which is not explicitly shown) of the electronic device, or a combination thereof. The controller executes the machine-readable instructions to perform some or all of the method 200, 400, 600, for example.

While the examples above describe averages, in other examples, the location profile includes other statistical determinations such as medians or other calculations that determine patterns or trends of a data set. While the examples above describe a specified time period that is a duration that the electronic device 106, 300, 500, 700, 806 is located in a location (e.g., the location 100, 110, 800), in other examples, the specified time period is based on a number of samples, a number of clock cycles, or other suitable time measurement. For example, in response to the electronic device 106, 300, 500, 700, 806 sampling the photosensor at one-minute intervals, the specified time period is equivalent to 60 samples of the photosensor, or 60 minutes. In various examples, time is based on a real-time clock, a system clock, a timer, or any other suitable time measurement logic.

While some components are shown as separate components of the electronic device 106, 300, 500, 700, 806, in other examples, the separate components are integrated in a single package. For example, the storage device 306, 506, is integrated with the controller 302, 502, respectively. The single package may herein be referred to as an integrated circuit (IC) or an integrated chip (IC).

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:

a photosensor; and a controller to:

determine a first delta value and a second delta value via the photosensor, the first delta value associated with a first lighting attribute of a first location, and the second delta value associated with a second lighting attribute of the first location;

in response to the first delta value being within a first attribute range and the second delta value being within a second attribute range, determine correlations between the first delta value, the second delta value, the first location, and a second location; and compare the correlations to determine if the electronic device has moved from the first location to the second location.

2. The electronic device of claim 1, wherein the first lighting attribute is a lighting intensity, a lighting color temperature, a lighting chromaticity, a lighting flickering frequency, a proximity of the electronic device to a lighting source, or a combination thereof.

3. The electronic device of claim 2, wherein the second lighting attribute is a different one of the lighting intensity, the lighting color temperature, the lighting chromaticity, the lighting flickering frequency, the proximity of the electronic device to the lighting source, or the combination thereof, than the first lighting attribute.

4. The electronic device of claim 1, wherein the controller is to adjust a resource setting in response to a determination that the electronic device has moved from the first location to the second location.

5. The electronic device of claim 4, wherein the resource setting comprises a display setting associated with a display device or an audio setting associated with an audio device.

6. The electronic device of claim 5, wherein the controller is to determine the resource setting based on a location profile associated with the second location.

7. The electronic device of claim 1, comprising an image sensor, and wherein the controller is to:

cause the image sensor to capture an image in response to a determination that the electronic device has moved from the first location to the second location; and verify the second location utilizing the image.

8. An electronic device, comprising:

a photosensor; and a controller to:

determine a first delta value, a second delta value, a third delta value, and a fourth delta value via the photosensor, the first delta value and the third delta value associated with a first lighting attribute of lighting, and the second delta value and the fourth delta value associated with a second lighting attribute of the lighting;

enable a timer in response to a determination that the first delta value is within a first attribute range and the second delta value is within a second attribute range;

determine an elapsed time of the timer in response to a determination that the third delta value is outside the first attribute range and the fourth delta value is outside the second attribute range;

in response to the elapsed time being within a first time range, determine the electronic device has moved from a first location to a second location; and in response to the elapsed time being within a second time range, determine the electronic device has moved from the first location to a third location.

9. The electronic device of claim 8, wherein the controller is to determine the third delta value and the fourth delta value subsequent in time to determining the first delta value and the second delta value, respectively.

10. The electronic device of claim 8, wherein the controller is to adjust a resource setting from a first setting to a second setting in response to the electronic device moving from the first location to the second location or to the third location.

11. The electronic device of claim 10, wherein the controller is to retrieve the second setting from a location profile for the second location or a location profile for the third location.

12. The electronic device of claim 10, wherein the resource setting comprises a display setting associated with a display device or an audio setting associated with an audio device.

13. A non-transitory machine-readable medium storing machine-readable instructions, which, when executed by a controller, cause the controller to:

determine a first delta value and a second delta value via a photosensor, the first delta value associated with a first lighting attribute of lighting, and the second delta value associated with a second lighting attribute of the lighting;

in response to the first delta value being within a first attribute range and the second delta value being within a second attribute range, determine correlations between the first delta value and the second delta value and multiple locations; and compare the correlations to determine in which location of the multiple locations an electronic device is located.

14. The non-transitory machine-readable medium of claim 13, wherein the first attribute range and the second attribute range are determined by a location of the multiple locations, by a lighting source, by a location profile, or a combination thereof.

15. The non-transitory machine-readable medium of claim 14, wherein the location profile includes samples of the photosensor while the electronic device is within a specified location, ranges of different lighting attributes while the electronic device is within the specified location, time ranges that indicate an amount of time that the electronic device is within the specified location, indicators for different resources of the electronic device, an indicator for the specified location, or a combination thereof.

16. The non-transitory machine-readable medium of claim 15, wherein the indicator for the specified location includes a location identifier, a description of the location, an environment identifier, or a combination thereof.

17. The non-transitory machine-readable medium of claim 13, wherein the machine-readable instructions, when executed by the controller, cause the controller is to enable a location determination logic to verify the location of the multiple locations in which the electronic device is located.

18. The non-transitory machine-readable medium of claim 13, wherein the machine-readable instructions, when executed by the controller, cause the controller is to:

determine a first average of the first attribute range and a second average of the second attribute range;

determine a first standard deviation from the first average for the first delta value and a second standard deviation from the second average for the second delta value; and determine a correlation of the first delta value and the second delta value to a first location of the multiple locations using the first standard deviation and the second standard deviation.

19. The non-transitory machine-readable medium of claim 13, wherein the machine-readable instructions, when executed by the controller, cause the controller to adjust a resource setting of the electronic device based on the location of the multiple locations in which the electronic device is located.

20. The non-transitory machine-readable medium of claim 19, wherein the resource setting comprises a display setting associated with a display device or an audio setting associated with an audio device.

* * * * *